United States Patent
Kawashima et al.

(10) Patent No.: US 7,944,785 B2
(45) Date of Patent: May 17, 2011

(54) OPTICAL DISC RECORDING/REPRODUCING APPARATUS AND FOCUS-SERVO METHOD THEREOF

(75) Inventors: Toru Kawashima, Mito (JP); Hiroharu Sakai, Tokyo (JP); Takeyoshi Kataoka, Yokohama (JP); Motoyuki Suzuki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 700 days.

(21) Appl. No.: 11/474,506

(22) Filed: Jun. 26, 2006

(65) Prior Publication Data

US 2007/0121443 A1    May 31, 2007

(30) Foreign Application Priority Data

Nov. 30, 2005  (JP) ................... 2005-345330

(51) Int. Cl.
  *G11B 7/09*  (2006.01)
(52) U.S. Cl. .................. 369/44.29; 369/44.26
(58) Field of Classification Search .............. 369/44.26
  See application file for complete search history.

(56) References Cited

U.S. PATENT DOCUMENTS

| | | | |
|---|---|---|---|
| 5,568,461 A | 10/1996 | Nishiuchi et al. | |
| 5,732,051 A * | 3/1998 | Yamaguchi et al. | 369/44.25 |
| 5,914,921 A * | 6/1999 | Yanagi | 369/44.27 |
| 6,172,961 B1 * | 1/2001 | Tanoue et al. | 369/275.4 |
| 6,996,044 B2 * | 2/2006 | Takeda | 369/53.22 |

FOREIGN PATENT DOCUMENTS

| | | |
|---|---|---|
| CN | 1409299 A | 4/2003 |
| JP | 10-027354 | 1/1998 |
| JP | 10-162379 | 6/1998 |
| JP | 2000-105934 | 4/2000 |
| JP | 2000-285484 | 10/2000 |
| JP | 2002-183988 | 6/2002 |
| JP | 2002-319155 | 10/2002 |
| JP | 2003-99950 | 4/2003 |
| JP | 3661623 | 4/2005 |

OTHER PUBLICATIONS

Chinese Office Action, with English Translation, issued in Chinese Patent Application No. CN 2006-10126453.4 dated Feb. 15, 2008.
Japanese Office Action issued in Japanese Patent Application No. 2005-345330, dated May 11, 2010.

* cited by examiner

*Primary Examiner* — Hoa T Nguyen
*Assistant Examiner* — Mark L Fischer
(74) *Attorney, Agent, or Firm* — McDermott Will & Emery LLP

(57) ABSTRACT

A focus-servo control method of an optical disc recording/reproducing apparatus, for recording or reproducing information onto/from an optical disc having a track with a land and a groove, which are formed in a spiral manner on an information recording surface thereof, the optical disc recording/reproducing apparatus including an objective lens, the method comprising steps of: moving an optical spot from the land to the groove or from the groove to the land through a L/G exchange portion therebetween and moving a position of the objective lens from a land position to a groove position by gradually changing a focus offset value for the land to a focus offset value for the groove from a position located before the L/G exchange portion, when the optical spot moves from the land to the groove.

8 Claims, 6 Drawing Sheets

FG SIGNAL
(IN CASE OF 12 PULSES PER 1 PORTATION)

LAND/GROOVE EXCHANGE PORTION

1 ROTATION OF OPTICAL DISK

RELATIONSHIP BETWEEN ZONE AND Δt

OPTICAL DISC RECORDING/REPRODUCING APPARATUS AND FOCUS-SERVO METHOD THEREOF

BACKGROUND OF THE INVENTION

The present invention relates to recording/reproducing method and apparatus being able to record and reproduce information onto/from an optical disc, which forms a land and a groove on a recording surface thereof, and in particular, a focus-servo technique thereof for achieving recording/reproducing with high quality and stability, when conducting recording/reproducing on the disc rotating at a high velocity thereof, irrespective of a radius direction thereon, upon a presumption of a disc velocity being constant in rotation velocity thereof, such as, CAV (i.e., Constant Angular Velocity) and/or ZCAV (i.e., Zoned Constant Angular Velocity).

An optical disc of a disc-like optical information recording medium, such as, CD or DVD, etc., for example, is widely used as an information recording medium, because of characteristics or abilities thereof, i.e., non-contact, a large memory capacity, a low-cost, and enabling data access at high speed, for example, for recording/reproducing of digital audio data and/or digital video data, and further, as a data recording medium for a personal computer. In recent years, such an optical disc of rewritable type, as DVD-RAM (i.e., Digital Versatile Disc of Random Access Memory Type), for example, has been utilized widely.

With such the DVD-RAM disc, a recording medium of phase-changeable type is applied as a recording layer thereof. To increase the recording capacity thereof, there is applied so-called a single track format, i.e., a land and a groove appear, alternately, per one (1) rotation thereof, so that recording/reproducing can be made not only on the groove, but also on the land defined between the grooves.

However, since the optimal focus offset differs between the groove and the land, an operation is conducted by exchanging the focus offset at the position where exchanging is made between the groove and the land, in case when recording or reproducing by means of an optical pickup.

However, accompanying with development of high speed DVD-RAM in recent years, also the time period is shortened when a laser spot irradiated from the optical pickup passes through the exchanging portion between the groove and the land. For this reason, it is difficult to maintain a response speed of a focus actuator for the optical pickup, necessary for conducting or completing the exchanging operation of the focus offset at that switchover or exchange position, and in particular, in the operation of high-speed recording or high-speed reproducing higher than an eight-speed (i.e., 8X), there occurs a problem that the information recorded or reproduced is degraded or deteriorated in quality thereof.

Conventionally, as countermeasure of this, a technology is already known or disclosed in the following Patent Document 1, for example, as an improvement when exchanging between the focus offset at the position where exchanging is made between the groove and the land; i.e., adding a correction onto the optimal focus offset (Gopt) for the groove, or the optimal focus offset (Lopt) for the land, by a predetermined amount thereof, and thereby making the difference small, between those Gopt and Lopt.

Also, in the following Patent Document 2 is disclosed a technology of providing an equalizer means for boosting RF signals from the optical disc, and a demodulation means for demodulating data based on the signals from the equalizer means mentioned above, as a countermeasure for the deterioration of the reproduced signal, which accompanying exchange or switchover of the focus offset.

Patent Document 1: Japanese Patent Laying-Open No. 2002-319155; and

Patent Document 2: Japanese Patent No. 3,661,623.

As was mentioned, since no such presumption was made on the disc velocity (i.e., variable speed), with those conventional arts mentioned above, that the rotation velocity is always constant irrespective of the radius portion on the disc, therefore it is impossible to protect the information, which is recorded or reproduced under such variable speed of the disc, from being degraded or deteriorated in the quality thereof, fully. In addition thereto, since variation (or shortening) of rotation speed due to the variable speed of the disc is remarkable, as the disc rotation speed increases to be high, there is necessity of speed responding to the recording or the reproducing, however it is difficult to follow such variable speed of the disc with the conventional arts mentioned above.

BRIEF SUMMARY OF THE INVENTION

An object of the present invention is to provide a focus-servo controlling method for fully enabling reproduction or recording of signals at the exchanging position between the groove and the land, irrespective of high speeding of the drive in recent years, upon presumption of the variable disc speed, such as, the CAV or the ZCLV, and thereby achieving high quality recording/reproducing, with stability, and further an optical disc recording/reproducing apparatus applying such the method therein.

For accomplishing the object mentioned above, according to the present invention, first of all, there is provided a focus-servo control method within an optical disc recording/reproducing apparatus, for recording or reproducing information onto/from an optical information recording medium having a track with a land and a groove, which are formed in a spiral manner on an information recording surface thereof, with moving an optical spot from the land to the groove, or from the groove to the land via an exchange or switchover portion therebetween, wherein within a region starting from a position advancing by a predetermined time period from appearance of the exchange portion exchanging from said land to said groove or from said groove to said land, a focus-offset value is exchanged or switched over from an offset value for the land or the groove to the offset value for the groove or the land, gradually.

Also, according to the present invention, for accomplishing the object mentioned above, there is further provided an optical disc recording/reproducing apparatus, enabling to record or reproduce information onto/from an optical information recording medium loaded therein, including a track with a land and a groove, which are formed in a spiral manner on an information recording surface thereof, comprising: a rotational driving portion for rotationally driving said optical information recording medium; an optical head device, being disposed opposing to the information recording surface of said optical information recording medium rotationally driven by said rotational driving portion, and movable in a radial direction thereof; a driving portion for driving said optical head device; and a system controller for controlling at least said rotational driving portion and said driving portion of said apparatus, thereby recording or reproducing the information onto/from said optical information recording medium, with moving an optical spot of said optical head device, from the land to the groove or the groove to the land, via an exchange or switchover portion therebetween, by means of a serve control, wherein said system controller exchanges over a focus offset value from an offset value for the land or the groove to the offset value for the groove or the land, gradually, within a region starting from a position advancing by a predetermined time period from appearance of the exchange portion exchanging from said land to said groove or from said groove to said land.

Further, according to the present invention, within the focus-serve control method and the optical disc recording/reproducing apparatus, as described in the above, preferably, a starting position of said region for conducting the exchange of said offset value is determined temporally constant in timing with respect to appearance of said exchange portion, or determined depending upon a rotation speed of said optical information recording medium, or determined depending upon a difference between the focus offsets, which are exchanged upon appearance of said exchange portion. Or, preferably, an ending position of said region for conducting the exchange of said offset value is determined to be prior to appearance of said exchange portion.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
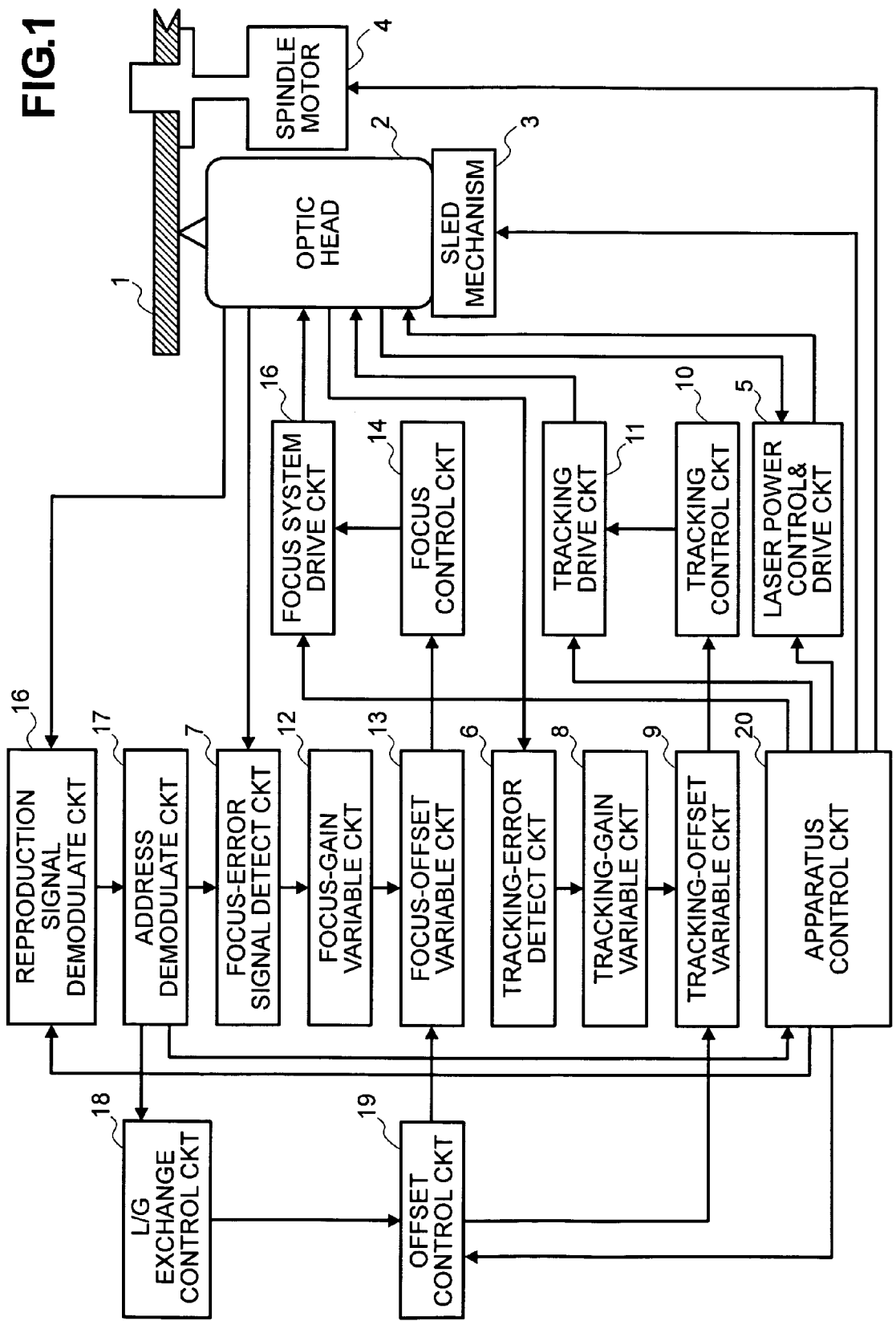
FIG. 1 is a circuit block diagram for showing brief structures of an optical disc recording/reproducing apparatus, according to an embodiment of the present invention.

First of all, FIG. 1 is a view for showing brief structures of an optical disc recording/reproducing apparatus, according to an embodiment of the present invention, and in particular, it is a circuit block diagram for showing the structural elements, mainly, so as to practice the focus-servo controlling method according to the present invention.

In the figure, a reference numeral 1 depicts an optical information-recording medium, such as, DVD-RAM, representatively, forming a Land and a Groove on the recording surface thereof, in a spiral manner. This disc-like information recording medium, i.e., an optical disc 1 is mounted by means of a holding member, such as, a turn table attached at a tip of a rotation shaft of a spindle motor 4, i.e., a rotationally driving means. Further, the rotation speed of this spindle motor 4 is always kept constant, through so-called the control method of CAV or ZCAV, irrespective of the radius position of the optical disc 1.

Opposing to the information-recording surface (i.e., the lower surface in the figure) of the optical disc 1, which is rotationally driven at the predetermined rotation speed, an optical head 2 is provided, being movable into the radial direction of the disc through a sled mechanism, which is constructed by a motor, a slide rail, rack-and-pinion gears, etc., though not shown in the figure. Further, although not shown in the figure, this optical head 2 irradiates a laser beam from a light source, such as, a semiconductor laser or the like, for example, which is provided inside the optical head 2, through an optic system including an objective lens therein, upon the information recording surface of the optical disc 1 mentioned above. Thereafter, a reflection light thereof is incident upon a photo detector, which is constructed with a phototransistor, etc., for example, also through the optic system including the objective lens as was mentioned above. The photo-detector converts the light received thereupon into electric signals, and outputs the electric signals therefrom. Thus, the electric signals from the photo-detector of the optical head 2 mentioned above are inputted into a focus-error signal detect circuit 7 and a tracking-error signal detect circuit 6, and further into a laser power control/drive circuit 5. Also, the reflection light modulated by pits formed on the information recording surface of the optical disc 1 is also converted into electric signals through the photo-detector mentioned above, and thereafter it is inputted into a reproduction signal demodulator circuit 16, to be demodulated (into RF signal) therein.

Also, the optical head 2 mentioned above moves the objective lens thereof into the direction perpendicular to the information-recording surface of the optical disc 1, with an aid of an actuator (for example, a voice coil, etc.) not shown in the figure, through a focus control circuit 14 and a focus system drive circuit 15; i.e., achieving the so-called focus control. And, through a tracking control circuit 10 and a tracking drive circuit 11 shown in the figure, the position of the optical head 2 in the tracking (or, disc radius) direction can be controlled. The tracking control circuit 10 and the tracking drive circuit 11, the focus control circuit 14 and the focus system drive circuit 15, and further the laser power control/drive circuit 5 are controlled by means of an apparatus control circuit 20, which is constructed with a CPU (i.e., a central processing unit) or the like, for example.

In more details thereof, as is apparent from the figure, an output of the reproduction signal demodulator circuit 16 is inputted into an address demodulate circuit 17 for demodulating an address from the RF signal demodulated, and an output thereof (i.e., the address signal) is inputted into an offset control circuit 19, for controlling focus offset at an exchange (i.e., a L/G exchange) position switching between a Land and a Groove, appearing alternately every one (1) rotation thereof on the information recording surface of the optical disc 1 (i.e., the DVD-RAM). However, the operation of this offset control circuit 19 is also controlled by means of the apparatus control circuit 20, which is constructed with the CPU (i.e., the central processing unit), etc., in the similar manner to the of the other control/drive circuits mentioned above.

Also, the focus-error signal (i.e., an FE signal), which is detected by the focus-error signal detect circuit 7 mentioned above from the electric signals of the optical head 2, is inputted into a focus-offset variable circuit 13, together with an output from the offset control circuit 19, through a focus gain variable circuit 12 for increasing/decreasing the gain and further it is supplied to the optical head 2 through the focus control circuit 14 and the focus system drive circuit 15 mentioned above. With this, the objective lens is driven, and thereby adjusting the focus offset, as well as, the operation of exchanging the focus offset.

Further, a tracking-error signal (i.e., a TE signal), which is detected by tracking-error signal detect circuit 6 mentioned above from the electric signals of the optical head 2, is inputted into a tracking offset variable circuit 9, also together with an output from the offset control circuit 19, through a tracking-offset gain variable circuit 8 for increasing/decreasing the gain thereof depending upon necessity thereof, and further it is supplied to the optical head 2 through the tracking control circuit 10 and the tracking drive circuit 11 mentioned above. With this, the optical head 2 including the objective lens therein is driven, and thereby adjusting the position thereof in the radial direction of the disc, as well as, tracking operation thereof while exchanging from the Land to the Groove, or from the Groove to the Land, alternately.

Next, explanation will be made about the focus-servo control method according to the present invention, to be practiced within the optical disc recording/reproducing apparatus, the structures of which are shown in the above. However, at first, detailed explanation will be made below, about the principle of the focus-servo control method according to the present invention.

In general, due to coming-off (or slip-out) of the focus position from an appropriate or proper one, the spot configuration on the disc surface is widen in the direction horizontal to the track, or/and is expanded into the direction perpendicular or vertical to the track. If it is widen into the horizontal direction, then amplitude goes down, in particular, in high-frequency components of the reproduction signal when reproducing, and therefore a reproduction error rate is increased. On the other hand, when recording, the recording power is reduced for forming a recording mark width, comparing to that when it is in appropriate. Also, if it is expanded in the vertical direction, the reproduction signal leaks into a neighboring track (i.e., cross-talk), when reproducing, and therefore the reproduction error rate is increased. On the other hand, when recording, there is caused deleting or erasing of the recording mark on the neighboring track (i.e., cross-erase), depending upon cases, and this results deteriorating or degrading quality of the signals recorded on the neighboring track.

Figure 2:
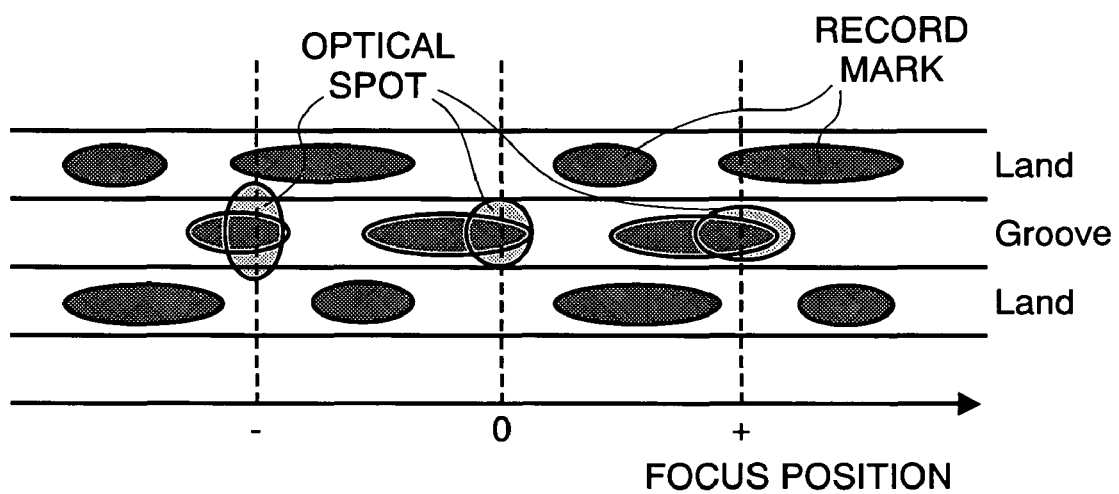
FIG. 2 is a view for explaining about the structures of a land and a groove on a recording surface of an optical disc and an optic spot, onto/from which information is recorded or reproduced by means of the optical disc recording/reproducing apparatus mentioned above.
Figure 3:
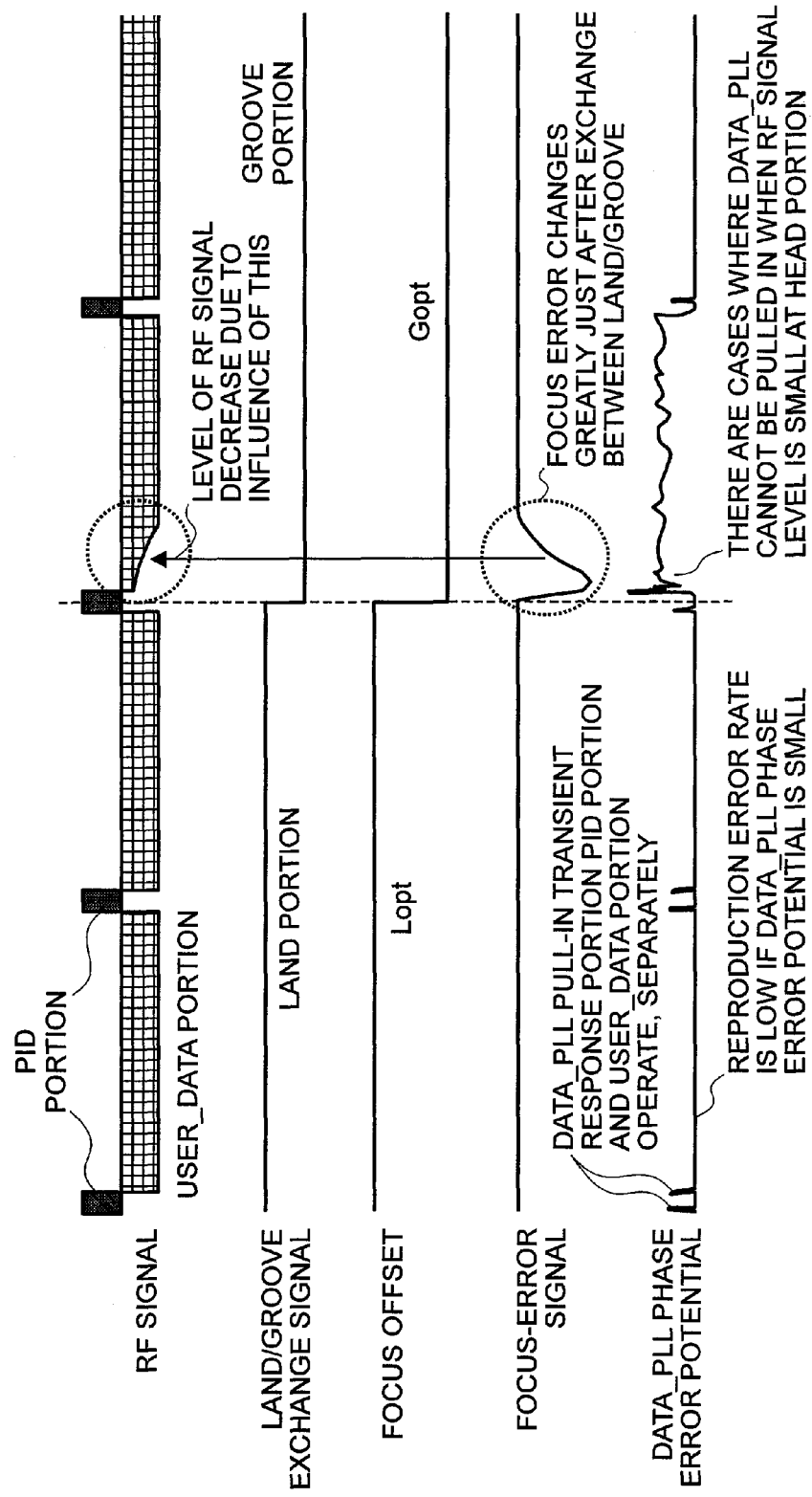
FIG. 3 is a view for showing waveforms at various portions in the optical disc recording/reproducing apparatus, during when focusing operation.

By referring to FIG. 2, the physical difference between the Land and the Groove lies in the difference in level of about 60-70 nm, in general. However, since each the reproduction error rate is adjusted so that it comes to be minimum, there sometimes occur cases where a much larger difference is generated between them. This is mainly caused due to variety or unevenness of the spot configuration, and is changed upon influences of various aberrations. In particular, within such DVD-RAM relating to the present invention, since the Groove is positioned far from the objective lens, it can easily receive the influences due to the cross-talk, as compared to the Land to be positioned in front thereof. Therefore, the objective lens is likely adjusted into the focus position so that the spot does not expand in the direction vertical to the Groove. Further, when recording, in order to reduce interferences between the marks, sometimes the optical spot is adjusted in the width thereof in the horizontal direction.

For that reason, in case where the focus positions of the Land and the Groove largely differ from each other, the optical head 2 cannot response, directly or immediately, due to the inertia thereof, for example. Therefore, just after appearance of the L/G exchange portion mentioned above, user data to be recorded onto the track on the recording surface, in particular, a head portion thereof comes into the condition that it lies at an improper position. For this reason, the recording power goes up and down, and this deteriorates the recording quality thereof. Further, since the space frequency characteristics come to be inappropriate to the frequency characteristics of the reproducing system thereof when reproducing, then the reproduction error rate goes up. Moreover, at head portion of the data is provided so-called VFO (Voltage Frequency Oscillation) area or region, where signal information is recorded to referred to, as criteria for operations of the reproducing system, and if it is impossible to reproduce that portion correctly or properly, not only that VFO region, but also one (1) sector headed by that VFO region as a whole come to be error, and thereby increasing the error.

Namely, on the DVD-RAM are provided a PID portion including address information therein, which is recorded on the disc in advance, and a user data (i.e., USER_DATA) portion for a user to record the information therein. Those PID portion and the user data (i.e., USER_DATA) portion make up so-called a sector, in a pair thereof, and further sixteen (16) pieces of sectors, each one (1) block is a unit for recoding/reproducing. However, the signals within the respective areas or regions differ in the phase thereof, and for that reason, for the purpose of reproducing and demodulating the data of the respective portions, it is necessary to produce signals obtained by digitizing the respective signals, i.e., producing clocks (CLKs) in synchronism with the respective signals by means of PLL (DATA_PLL), discriminating with using those clocks (CLKs) produced, and producing through the digitizing process synchronized with those clocks (CLKs).

However, with the PID portion and the user data (Le., USER_DATA) portion mentioned above, the PLL (DATA_PLL) must be pulled into, separately, and for that purpose, at each of the head portion thereof, there is provided the VFO (Voltage Frequency Oscillation) area or region, respectively, each being built up with repetition of 4T-4T pattern, for example. However, in this VFO region, since there are only several tens Bytes guaranteed for maintaining recording capacity in the user data portion, and since the PLL (DATA_PLL) conducts the pull-in at high speed, therefore, in this VFO region, it is common that the operation is conducted at a higher gain comparing to that in the data (i.e., DATA) area or region including the user data (i.e., USER_DATA) portion therein. For this reason, in case where the recording quality is bad in this VFO region, fluctuation in phase comes to be large, and it takes time for pulling-in of the PLL (DATA_PLL), or it is impossible to achieve the pulling-in thereof. Also, if taking time for this pulling-in, the reproduction error rate is degraded even when moving into a portion being good or preferable in the recording quality. And in case of failure of obtaining pulling-in of PLL (DATA_PLL), then the entire of that sector are in the condition of reproduction error, and the error goes up, greatly.

Then, according to the present invention, accomplished upon basis of study/finding mentioned in details above, which are made by the inventors and so on, and in the study for acceleration or speed-up of the DVD-RAM drive, for dissolving a problem that the VFO region cannot be reproduced just after the exchange portion between the Groove and the Land of the disc, in particular, when recording or reproducing at high speed higher than eight-speed (i.e., 8X), then the entire of one (1) sector are in error, exchange from the optimal focus offset (Gopt) for the Groove to the optimal focus offset (Lopt) for the Land is carried out, gradually in a step-wise manner, fitting to the rotation speed of the disc, thereby achieving compatibility with both, i.e., the high-speed and the variable speed thereof.

Figure 4:
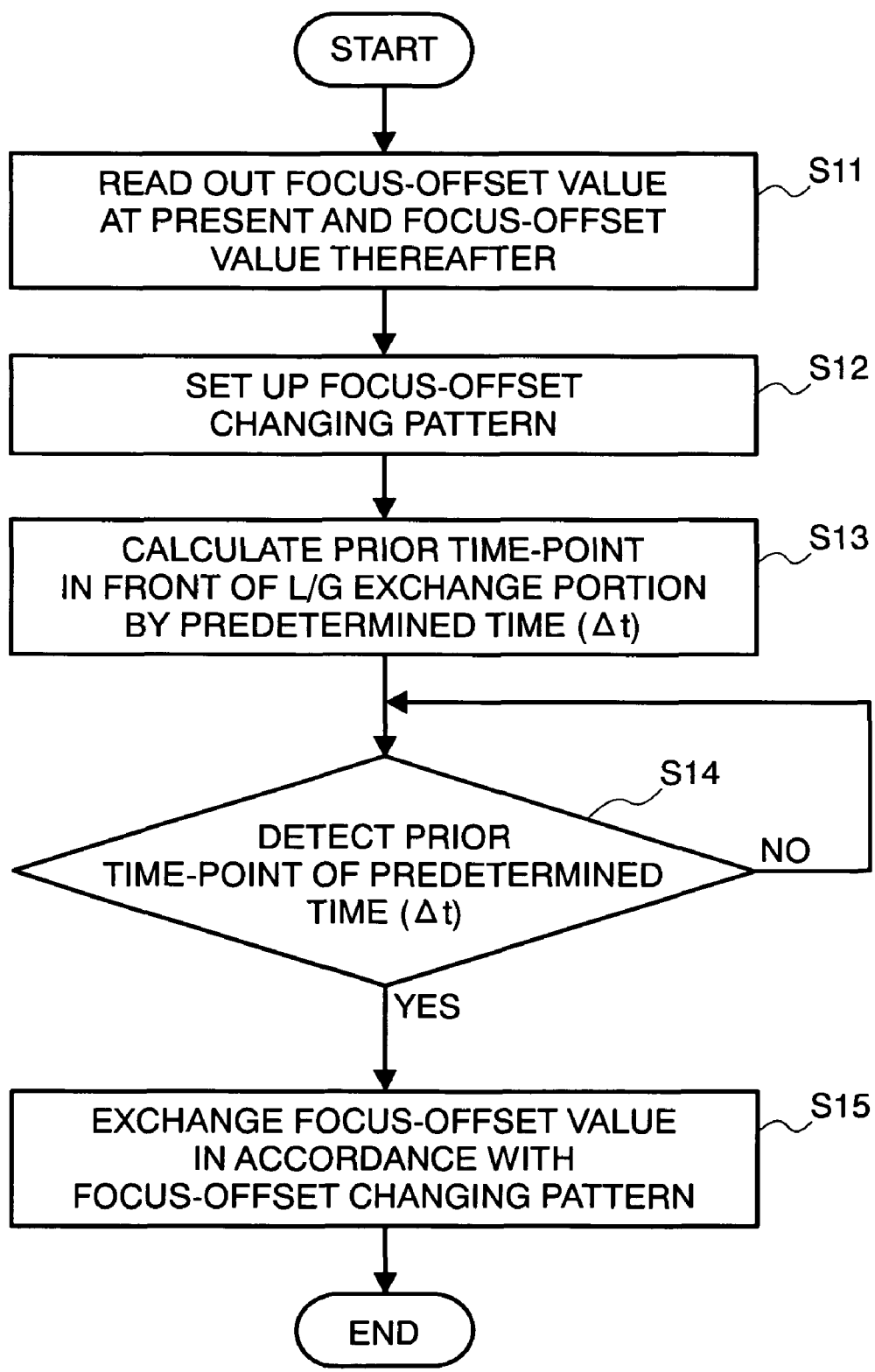
FIG. 4 is a flowchart diagram for explaining the details of a focus-servo controlling method, according to the present invention.

Based on the foregoing, explanation will be given below, about the focus-servo controlling method according to the present invention, by referring to the flowchart in FIG. 4 attached herewith. For obtaining the variable focus position, there are two methods, i.e., an offset voltage variable method of applying DC voltage thereto, and a balance variable method of changing or varying a ratio of difference, which is obtained by differentiating two (2) signals from a pickup (PIC) when forming a focus-error signal. However, the following will explain the method of varying the focus offset, for easily understanding the present invention.

The following processes begins upon detection of a position advancing one (1) sector from where the L/G exchange portion appears (i.e., a process starting position), and they are executed by a CPU (i.e., the Central Processing Unit) building up the apparatus control circuit 20. Detection of this L/G exchange portion can be carried out easily by using a FG signal in synchronism with rotation, which is outputted from the spindle motor 4 mentioned above, as shown in Fig, 6 attached herewith, for example, i.e., memorizing the detection of the L/G exchange portion after loading the optical disc onto the apparatus, responding or referring to pulses of the FG signal. In the present embodiment, there is shown an example of outputting twelve (12) pieces of pulses per one (1) revolution of the disc, wherein it is possible to detect the L/G exchange portion by the rise-up of the pulse FG[2]. And, the position advancing by one (1) sector (i.e., the process starting position) can be obtained, easily, by predicting the process starting position upon basis of this detectable L/G exchange portion.

Figure 5:
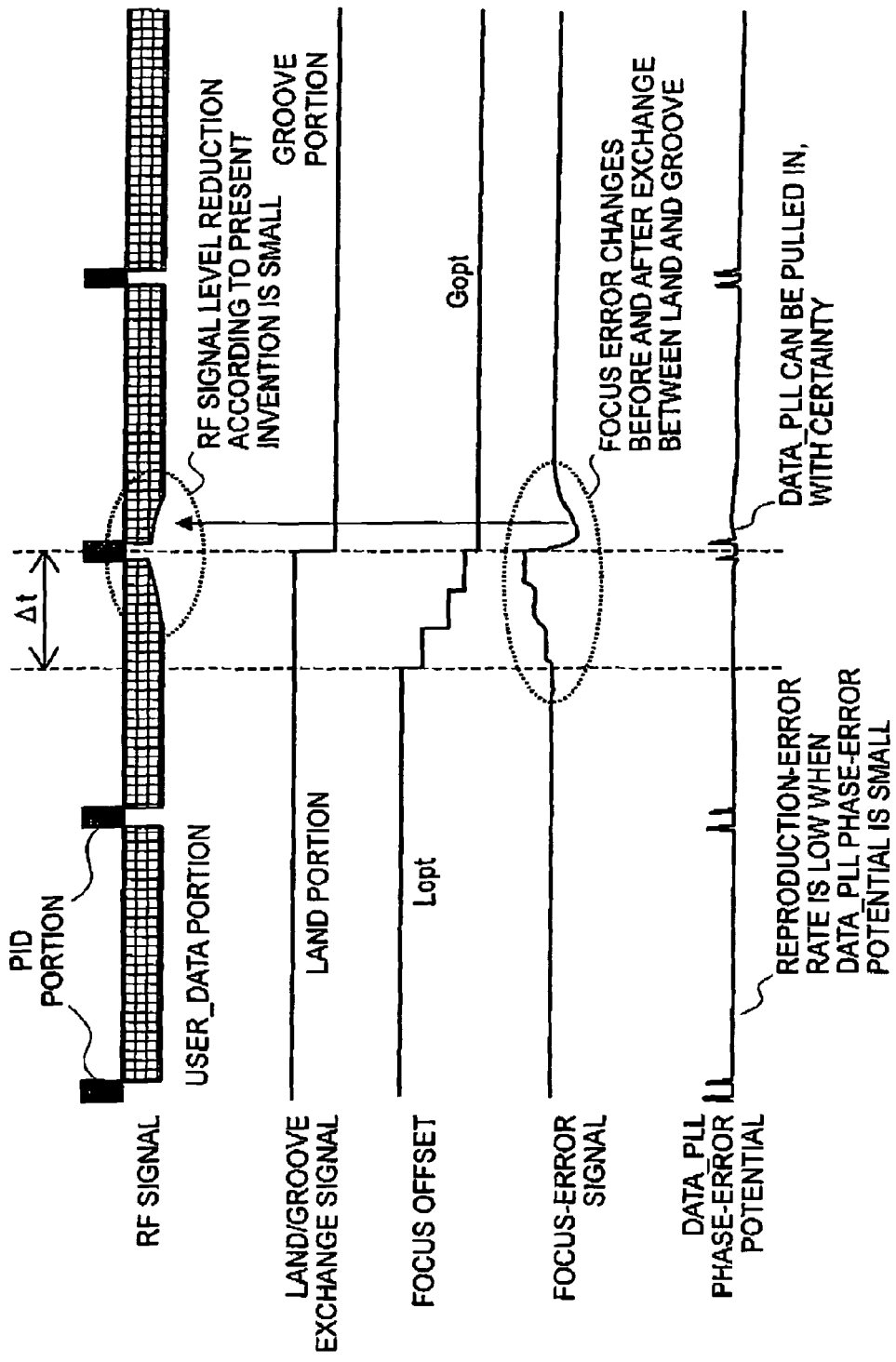
FIG. 5 is a view for showing waveforms at various portions in the optical disc recording/reproducing apparatus, during when focusing operation, according to the focus-servo controlling method of the present invention.
Figure 6:
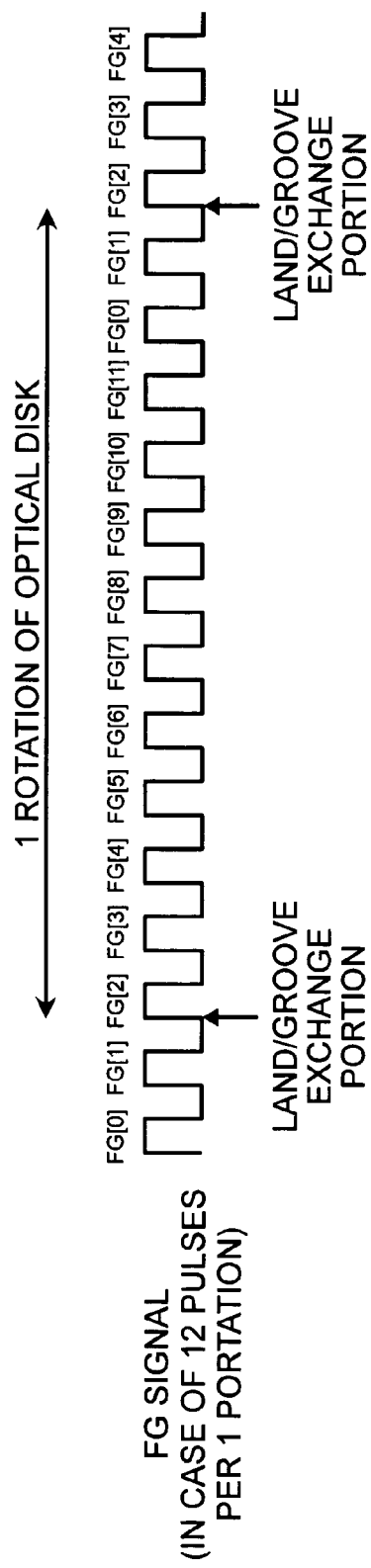
FIG. 6 is a view for showing an example of methods, for detecting a position (i.e., a process starting position) before appearance of a L/G exchange portion, within the optical disc recording/reproducing apparatus, including a waveform of a FG signal therein.

Next, when starting the processes upon detection of the process starting position mentioned above, at first the focus-offset value (i.e., the Lopt) at that instance or time point (for example, on the Land) is read out, and then the focus-offset value (i.e., the Gopt) after appearance of the L/G exchange portion (in this example, on the Groove) is read out (S11). And, the focus-offset value to be altered or changed accompanying with appearance of the L/G exchange portion (i.e., a focus-offset changing pattern) is so set up that it changes the changing value thereof, gradually (S12). In the present embodiment, as is shown in FIG. 5, the focus-offset value is gradually changed in a manner of four (4) steps. Then, calculation is made on the prior time point advancing by a predetermined time period (i.e., $\Delta t$) from the L/G exchange portion appearing next (S13). However, this predetermined time period ($\Delta t$) is set up responding to a response speed or the like of the optical head 2, and those setting values calculated out may be memorized into a memory, which builds up the apparatus control circuit 20 mentioned above.

Thereafter, when detecting that prior time point advancing by the predetermined time period (i.e., $\Delta t$) mentioned above (S14), the focus offset is exchanged, gradually (in the present example, in step-wise), in accordance with the focus-offset changing pattern, which is set up in the above (see the focus-offset signal shown in a middle portion in FIG. 4), and thereby completing a series of the processes. However, the prior time point advancing by the predetermined time period (i.e., $\Delta t$) can be determined by counting signals synchronized with the rotation of the optical disc, for example, signals that are obtained by digitizing wobble signals recorded through waving or wobbling the Groove on the disc at the frequency almost consistent with the rotation thereof, or alternatively, the clock (i.e., wobble_CLK) signals in synchronism with those signals. A reason of using the signals fluctuating or altering depending on the rotation speed of the disc, in this manner, lies in that the apparatus produces various kinds of control signals, such as, the L/G exchange signal, etc., upon basis of the singles synchronized with the rotation, and that it is easy to control calculation and generating timings thereof.

As was mentioned above, because of gradually (in step-wise) exchanging of the focus offset thereof when exchanging from the Land to the Groove (or from the Groove to the Land), the focus-error signal at the exchange portion alters (i.e., goes up) gradually from the prior time point advancing by the predetermined time period (i.e., $\Delta t$), as is shown in the second stage from the bottom in FIG. 5 attached herewith. However, the change of the focus-error signal can be made smaller when the exchange portion appears, i.e., it is possible to reduce or lower an amount of change of the focus-error signal at the exchange portion. And, with this, as is shown at the lowest stage in FIG. 5, the PLL (i.e., DATA_PLL) phase-error potential obtained does not alter (i.e., go up) irrespective of appearance of the exchange portion between the Land and Groove; therefore, it is possible to keep the reproducing error rate to be low. Also, as apparent from the waveforms in the figure, level of the obtained RF signal at the head portion thereof can be kept large, and therefore it is possible to achieve pull-in of the PLL (i.e., DATA_PLL), with certainty.

Figure 7:
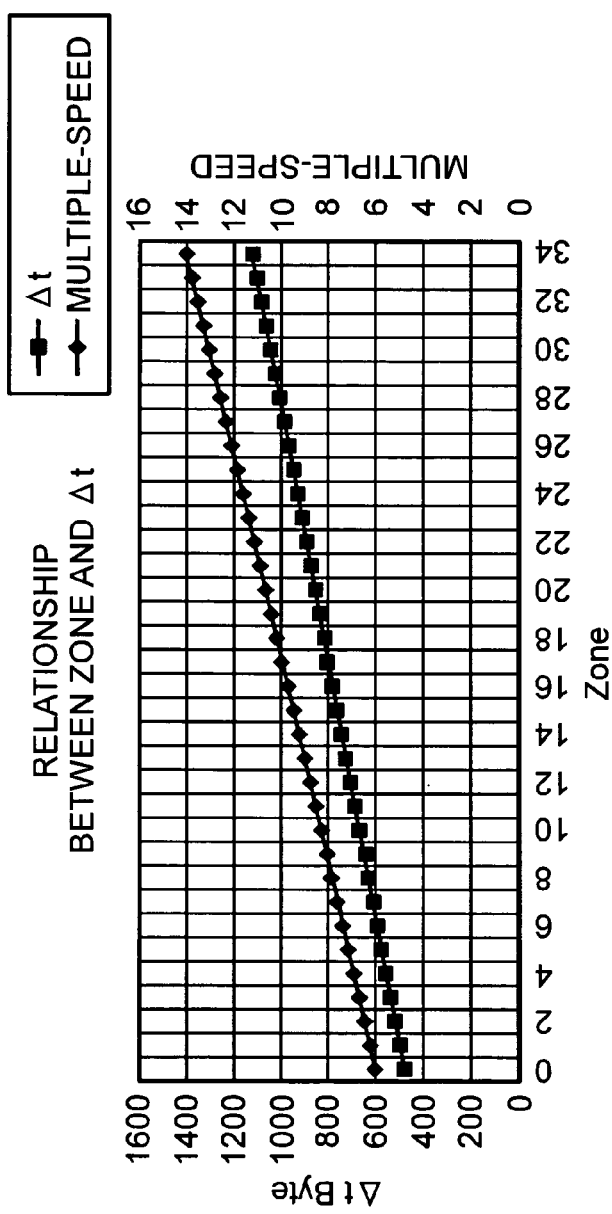
FIG. 7 is a view for showing an example of a relationship between Zone and a predetermined time period ($\Delta t$), which is applied within the focus-servo controlling method mentioned above.

However, in cases where conducting recoding/reproducing with the method of CAV or ZCAV mentioned above, it is necessary to alter or change a count number, depending upon the position thereof, so that the time comes to be constant irrespective of the radius position on the disc. Thus, it Is necessary to make such a set-up that the count number on the outer periphery side comes to be much larger, comparing to that on the inner periphery, i.e., directing from an inner periphery to an outer periphery of the disc. Then, the relationship between a zone (i.e., Zone) and the predetermined time period (i.e., $\Delta t$) may be so set up or determined, as is shown in FIG. 7 attached herewith. Further, this relationship may be memorized into the memory building up the apparatus control circuit 20, in advance, and thereby it is possible to keep the predetermined time period (i.e., $\Delta t$) constant irrespective of the radius position on the disc.

In the examples mentioned above, the focus offset mentioned was explained to gradually (or step-wise) alter or change prior to the exchange portion between the Land and the Groove. However, according to the present invention, it is also possible to set up, so that the amount of changes on the offset changing prior or advancing the exchange portion may be about a half thereof, while remaining thereof will be changed after the said exchange portion. Thus, changing the focus offset, gradually, covering over before and after the exchange portion also enables obtaining of the effects similar to that mentioned above.

In addition thereto, it is also possible to determine the predetermined time period (i.e., $\Delta t$), depending on the difference between the focus offset (i.e., Lopt) on the Land and the focus offset (Gopt) on the Groove. With this, it is possible to reduce the region where the recording/reproducing is made under the improper offset (i.e., the region where the focus offset is changed gradually) down to the smallest, therefore it is possible to enable the recording/reproducing of information with higher quality. However, the above is made due to the fact that, at the head portion and the last portion of each data (i.e., USER_DATA) area, there is provided so-called "Grard" region, which can be unused, upon presumption of deterioration of the recording film, due to flowage thereof, generating upon repetition of the Overwrite operation, and that it does not matter if the offset is inappropriate or improper in those regions. For this reason, in case where an amount of difference between the offsets is small, the position advancing or prior to exchange between L/G (i.e., Δt) may be located near to the L/G exchange portion.

In the similar manner, also in case where the amount of difference between the offsets is small, it is possible to lower the offset amount or value (i.e., the difference between the optimal focus offset (i.e., Gopt) for the Groove and the optimal focus offset (i.e., Lopt) for the Land) to be exchanged at the L/G portion. In this manner, rationalizing the positions where the change starts and/or the amounts or values thereof, depending upon an amount or value in the difference between those offsets, enables to suppress or reduce the region where the offset is improper within a region necessary for recording or reproducing, at the smallest.

As was fully explained in the above, with the focus-servo control method according to the present invention, conducting exchange between the optimal focus offset (Gopt) for the groove and the optimal focus offset (Lopt) for the land, in conformity with the disc rotation speed, gradually, achieves compatibility with both, i.e., the high-speed and the variable speed, and further by applying such method therein, it is possible to provide the optical disc recording/reproducing apparatus, enabling to achieve high quality recording/reproducing of information, with stability.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A focus-servo control method of an optical disc recording/reproducing apparatus, for recording or reproducing information onto/from an optical disc having a track with a land and a groove, which are formed in a spiral manner on an information recording surface thereof, the optical disc recording/reproducing apparatus including an objective lens, the method comprising steps of:
    moving an optical spot from the land to the groove or from the groove to the land through a L/G exchange portion therebetween;
    moving a position of the objective lens from a land position to a groove position by gradually changing a focus offset value for the land to a focus offset value for the groove from a position located before the L/G exchange portion, when the optical spot moves from the land to the groove; and
    moving the position of the objective lens from the groove position to the land position by gradually changing the focus offset value for the groove to the focus offset value for the land from a position located before the L/G exchange portion, when the optical spot moves from the groove to the land.

2. The focus-servo control method, as described in claim 1, wherein the position from which the focus offset value starts gradually changing is determined temporally constant in timing with respect to an appearance of said L/G exchange portion.

3. The focus-servo control method, as described in claim 1, wherein the position from which the focus offset value starts gradually changing is determined depending upon a rotation speed of said optical disc.

4. The focus-servo control method, as described in claim 1, wherein the position from which the focus offset value starts gradually changing is determined depending upon a difference between the focus offset value for the land and the focus offset value for the groove, which are exchanged upon an appearance of said L/G exchange portion.

5. An optical disc recording/reproducing apparatus configured to record or reproduce information onto/from an optical disc including a track with a land and a groove, which are formed in a spiral manner on an information recording surface thereof, the optical disc recording/reproducing apparatus comprising:
    an optical disc driving portion for rotationally driving said optical disc;
    an optical head device including an objective lens, the optical head device being disposed opposing to the information recording surface of said optical disc rotationally driven by said optical disc driving portion, and movable in a radial direction thereof;
    an optical head driving portion for driving said optical head device; and
    a system controller for controlling at least said optical disc driving portion and said optical head driving portion of said apparatus, thereby recording or reproducing the information onto/from said optical disc by moving an optical spot of said optical head device, from the land to the groove or the groove to the land, through a L/G exchange portion therebetween, wherein:
    said system controller is configured to control said optical head driving portion to move a position of the objective lens by changing a focus offset value,
    said system controller is configured to move the position of the objective lens from a land position to a groove position by gradually changing a focus offset value for the land to a focus offset value for the groove from a position located before the L/G exchange portion, when the optical spot moves from the land to the groove, and
    said system controller is configured to move the position of the objective lens from the groove position to the land position by gradually changing the focus offset value for the groove to the focus offset value for the land from a position located before the L/G exchange portion, when the optical spot moves from the groove to the land.

6. The optical disc recording/reproducing apparatus, as described in claim 5, wherein said system controller determines the position from which the focus offset value starts gradually changing temporally constant in timing with respect to an appearance of said L/G exchange portion.

7. The optical disc recording/reproducing apparatus, as described in claim 5, wherein said system controller determines the position from which the focus offset value starts gradually changing depending upon a rotation speed of said optical disc.

8. The optical disc recording/reproducing apparatus, as described in claim 5, wherein said system controller determines the position from which the focus offset value starts gradually changing depending upon a difference between the focus offset value for the land and the focus offset value for the groove, which are exchanged upon an appearance of said L/G exchange portion.

* * * * *